(12) United States Patent
Kliem et al.

(10) Patent No.: US 10,457,116 B2
(45) Date of Patent: Oct. 29, 2019

(54) METHOD FOR OPERATING A VEHICLE TEMPERATURE CONTROL SYSTEM

(71) Applicant: Eberspächer Climate Control Systems GmbH & Co. KG, Esslingen (DE)

(72) Inventors: Thomas Kliem, Rottweil (DE); Jörg Zweckbronner, Kuchen (DE); Nikola Martinko, Esslingen (DE)

(73) Assignee: EBERSPÄCHER CLIMATE CONTROL SYSTEMS GMBH & CO. KG, Esslingen (DE)

( * ) Notice: Subject to any disclaimer, the term of this patent is extended or adjusted under 35 U.S.C. 154(b) by 537 days.

(21) Appl. No.: 15/034,703

(22) PCT Filed: Oct. 28, 2014

(86) PCT No.: PCT/EP2014/073123
§ 371 (c)(1),
(2) Date: May 5, 2016

(87) PCT Pub. No.: WO2015/067504
PCT Pub. Date: May 14, 2015

(65) Prior Publication Data
US 2016/0288615 A1    Oct. 6, 2016

(30) Foreign Application Priority Data

Nov. 8, 2013  (DE) .................. 10 2013 222 717

(51) Int. Cl.
*B60H 1/22*  (2006.01)
*B60H 1/00*  (2006.01)

(52) U.S. Cl.
CPC ..... *B60H 1/00878* (2013.01); *B60H 1/00828* (2013.01); *B60H 1/00971* (2013.01);
(Continued)

(58) Field of Classification Search
CPC .............. B60H 1/00828; B60H 1/2203; B60H 1/00878; B60H 1/00971; B60H 1/22; B60H 2001/2231; B60H 2001/224
(Continued)

(56) References Cited

U.S. PATENT DOCUMENTS 5,078,317 A  *  1/1992  Kenner ................... F23N 5/203
                                                        237/2 A
6,736,327 B1 *  5/2004  Hersel ................ B60H 1/00507
                                                        236/51
(Continued)

FOREIGN PATENT DOCUMENTS

DE         201 20 753 U1     3/2002
DE      10 2011 003273 A1    8/2012

*Primary Examiner* — Steven B McAllister
*Assistant Examiner* — John E Bargero
(74) *Attorney, Agent, or Firm* — McGlew and Tuttle, P.C.

(57) ABSTRACT

A method for operating a vehicle temperature control system includes, after activation of a vehicle heating unit (16) outputs an activation actuating command to a fan control unit (32), in response thereto the fan control unit (32) outputs a vehicle data bus disconnect command to a vehicle data bus disconnect unit (38), the vehicle data bus disconnect unit (38) disconnects a vehicle data bus (28) for providing a partial vehicle data bus (40) in response to receiving the vehicle data bus disconnect command from the fan control unit (32) and after providing the partial vehicle data bus (40), the fan control unit (32) outputs an activation actuating command to an air conditioning unit (34). The air conditioning unit (34) puts at least one vehicle fan (18) and/or at least one air flow influencing unit (36) into a specified operating condition in response to receiving the activation actuating command.

6 Claims, 2 Drawing Sheets

(52) U.S. Cl.
CPC ............ *B60H 1/22* (2013.01); *B60H 1/2203* (2013.01); *B60H 2001/224* (2013.01); *B60H 2001/2231* (2013.01)

(58) Field of Classification Search
USPC .......................................................... 237/5
See application file for complete search history.

(56) References Cited

U.S. PATENT DOCUMENTS

| | | | | |
|---|---|---|---|---|
| 8,938,565 | B2* | 1/2015 | Aubertin | ................ B60R 25/04 307/10.6 |
| 9,825,852 | B2* | 11/2017 | Hartwich | ............ G06F 13/4282 |
| 2007/0144723 | A1* | 6/2007 | Aubertin | ............ B60H 1/00642 165/202 |
| 2010/0106810 | A1 | 4/2010 | Grohman | |
| 2011/0133920 | A1* | 6/2011 | Meadors | ............... B60W 10/06 340/439 |

* cited by examiner

METHOD FOR OPERATING A VEHICLE TEMPERATURE CONTROL SYSTEM

CROSS REFERENCE TO RELATED APPLICATIONS

This application is a United States National Phase Application of International Application PCT/EP2014/073123 filed Oct. 28, 2014 and claims the benefit of priority under 35 U.S.C. § 119 of German Patent Application 10 2013 222 717.5 filed Nov. 8, 2013 the entire contents of which are incorporated herein by reference.

FIELD OF THE INVENTION

The present invention pertains to a method for operating a vehicle temperature control system.

BACKGROUND OF THE INVENTION

The temperature control systems provided in vehicles are generally configured to heat the air to be introduced into the interior of a vehicle by heat generated in the combustion operation of an internal combustion engine being transferred to the air to be introduced into the vehicle interior in a heat exchanger. The air to be introduced into the vehicle interior may, if necessary, also be cooled by a vehicle air-conditioning system.

If system areas are subsequently integrated as retrofit systems into such a vehicle temperature control system, their actuation-related linking with system areas that are already present in the vehicle is difficult to implement. The system areas and control units which are already present in a vehicle generally communicate via a vehicle data bus, for example, via a CAN bus, to which retrofit systems generally cannot be connected. As a result, such retrofit systems, for example, a vehicle heater to be retrofitted as a parking heater, can only be operated with limited functionality, and especially cannot act on system areas of the vehicle temperature control system that are already present in a vehicle.

SUMMARY OF THE INVENTION

An object of the present invention is to provide a method for operating a vehicle temperature control system, with which the integration of a system area provided, for example, as a retrofit system and the linking with system areas of a vehicle temperature control system already present in a vehicle can be implemented in a simple manner.

This object is accomplished according to the present invention by a method for operating a vehicle temperature control system, wherein the vehicle temperature control system comprises:

a vehicle data bus, a blower control unit in data exchange connection with the vehicle data bus for generating actuating commands at least for at least one vehicle blower, an air-conditioning control unit in data exchange connection with the vehicle data bus for generating actuating commands at least for at least one, preferably a plurality of, air flow influencing units, wherein the air-conditioning control unit is configured to receive actuating commands generated by the blower control unit at least for at least one vehicle blower via the vehicle data bus and to actuate the at least one vehicle blower corresponding to the actuating commands received, a preferably fuel-operated vehicle heater for providing heat to be transferred to the air to be introduced into a vehicle interior, wherein an operating device for inputting or/and generating information defining a heating operation to be carried out is associated with the vehicle heater, wherein the vehicle heater is in actuating connection with the blower control unit, and a vehicle data bus disconnect unit for disconnecting the vehicle data bus such that a partial vehicle data bus permitting the data exchange connection between the blower control unit and the air-conditioning control unit is provided, wherein the vehicle data bus disconnect unit is in actuating connection with the blower control unit, in which method after activating the vehicle heater:

a) the vehicle heater sends an activation actuating command to the blower control unit, b) the blower control unit sends a vehicle data bus disconnect command to the vehicle data bus disconnect unit in response to the receipt of the activation actuating command from the vehicle heater, c) the vehicle data bus disconnect unit disconnects the vehicle data bus for providing the partial vehicle data bus in response to the receipt of the vehicle data bus disconnect command from the blower control unit, d) the blower control unit sends an activation actuating command to the air-conditioning control unit after providing the partial vehicle data bus, and e) the air-conditioning control unit puts at least one vehicle blower or/and at least one air flow influencing unit into a specified operating state in response to the receipt of the activation actuating command from the blower control unit.

In the method according to the present invention, such a configuration of the vehicle control system is provided, in which the blower control unit, which is also, in principle, provided to generate actuating commands for one or possibly a plurality of vehicle blower motors, is in data exchange connection with the air-conditioning control unit or especially also with the vehicle blower motor via this air-conditioning control unit, on the one hand, but is also in actuating connection with the vehicle heater, on the other hand. Information about the operation or the circumstance that the vehicle heater is operating can thus be communicated to the blower control unit in the form of the actuating command sent by the vehicle heater. As a result, the blower control unit can ensure, by means of corresponding actuation of the vehicle data bus disconnect unit, that only a part of the vehicle data bus still permitting the communication of the blower unit with the air-conditioning control unit is switched on in the data communication running in the, for example, in the parking heating operation; the remaining part on the vehicle side or the rest of the vehicle data bus is disconnected from this communication. As a result, the transmission of data running during the operation of the vehicle heater, i.e., for example, during the parking heating operation especially between the blower control unit and the air-conditioning control unit from other system areas or control units connected, in principle, to the vehicle data bus is not detected and thus no unsuitable or in this phase unnecessary activities are triggered in these other areas during the operation of the vehicle heater.

In an especially advantageous variant of the method according to the present invention, provisions may be made for the air-conditioning control unit to be put into an operating state by the activation actuating command sent by the blower control unit in step d), wherein in the operating state, the air-conditioning control unit puts at least one vehicle blower or/and at least one air flow influencing unit into an operating state specified by the activation actuating command from the blower control unit. After providing the partial vehicle data bus, in which essentially only a communication between the blower control unit and the air-conditioning control unit occurs, the air-conditioning control unit can thus consequently not receive any information relevant for the operation thereof from the remaining area of the vehicle data bus, and the blower control unit provides that information which the air-conditioning control unit needs to put, for example, a vehicle blower motor or one or a plurality of air flow influencing units into a state that is suitable for the heating operation to be carried out. Hence, this is especially advantageous since then no information has to be stored in the air-conditioning control unit itself to put this air-conditioning control unit into the position to actuate various system areas in a suitable manner, for example, during a parking heating operation.

To heat a vehicle interior in a suitable manner during a heating operation of the vehicle heater, i.e., in order to be able to transfer the heat provided in the vehicle heater reliably to the air to be introduced into the vehicle interior or to be able to introduce this heat into the vehicle interior in a suitable manner, it is further suggested that at least one vehicle blower be actuated in the specified operating state for the operation at a predetermined speed, preferably within an average speed range, or/and a hot air flap unit as an air flow influencing unit to be in an actuating state providing a maximum temperature, or/and at least one air flap unit as an air flow influencing unit to be in a defrost position, or/and a fresh air/circulating air flap unit as an air flow influencing unit to be in a position providing a predetermined fresh air/circulating air ratio.

In order to put the vehicle temperature control system again into a state suitable for the start-up of the vehicle, if the operation of the vehicle heater shall be ended, for example, because of reaching a desired temperature of the vehicle interior or because of a sufficiently long heating, it is suggested that after ending the operation of the vehicle heater:

f) the blower control unit ends the sending of the activation actuating command to the air-conditioning control unit or/and sends a deactivation actuating command to the air-conditioning control unit, wherein after ending the sending of the activation actuating command or/and receipt of the deactivation actuating command, the air-conditioning control unit deactivates the at least one vehicle blower or/and puts at least one air flow influencing unit back into an initial state provided before carrying out step e), and the air-conditioning control unit assumes an inoperative state, and g) the blower control unit ends the sending of the vehicle data bus disconnect command or/and sends a vehicle data bus connect command to the vehicle data bus disconnect unit, wherein after ending the sending of the vehicle data bus disconnect command or/and receipt of the vehicle data bus connect command, the vehicle data bus disconnect unit ends the disconnection of the vehicle data bus for providing the partial vehicle data bus.

In principle, it cannot be ruled out that the operation of the vehicle shall be started, for example, even during a parking heating operation of the vehicle heater still before sufficient heating of the vehicle interior. In order to ensure that all system areas of the vehicle temperature control system can be put into a state suitable for the operation of the vehicle in such a situation, it is further suggested that if activities indicating a start-up of a vehicle are detected during the operation of the vehicle heater, h) the vehicle data bus disconnect unit ends the disconnection of the vehicle data bus, and, I) after the ending of the disconnection of the vehicle data bus, the blower control unit ends the sending of the activation actuating command to the data bus disconnect unit and the sending of the activation actuating command to the air-conditioning control unit.

Since the blower control unit no longer sends actuating commands to the air-conditioning control unit during this course of action, the air-conditioning control unit may, for example, reach its inoperative state again or reach an operating state, in which actuating commands correspondingly present in the vehicle data bus at that time can carry out a further thermal conditioning of the vehicle.

Since it cannot, in principle, be assumed that a sufficient heating has already occurred if such an interruption of the parking heating operation occurs, it is suggested that the vehicle heater resumes the heating operation preferably as a function of the temperature of a heat transfer medium to be heated by the vehicle heater and, furthermore, sends the activation actuating command to the blower control unit.

If the activities indicating a start-up of a vehicle are ended still before the actual heating operation of the vehicle heater shall be ended, steps b) through e) may be carried out again according to a further aspect of the present invention, i.e., the partial vehicle data bus can be re-established and the activation or actuation of the air-conditioning control unit by the blower control unit can be started again in response to the activation actuating command still in contact therewith.

The present invention pertains, furthermore, to a vehicle temperature control system, especially for carrying out a method according to the present invention, wherein the vehicle temperature control system comprises:

a vehicle data bus, a blower control unit in data exchange connection with the vehicle data bus for generating actuating commands at least for at least one vehicle blower motor, an air-conditioning control unit in data exchange connection with the vehicle data bus for generating actuating commands at least for at least one, preferably a plurality of, air flow influencing units, wherein the air-conditioning control unit is configured to receive actuating commands generated by the blower control unit at least for at least one vehicle blower via the vehicle data bus and to actuate the at least one vehicle blower corresponding to the actuating commands received, a preferably fuel-operated vehicle heater for providing heat to be transferred to the air to be introduced into a vehicle interior, wherein an operating device for inputting or/and generating information defining a heating operation to be carried out is associated with the vehicle heater, wherein the vehicle heater is in actuating connection with the blower control unit, and a vehicle data bus disconnect unit for disconnecting the vehicle data bus such that a partial vehicle data bus permitting the data exchange connection between the blower control unit and the air-conditioning control unit is provided, wherein the vehicle data bus disconnect unit is in actuating connection with the blower control unit.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
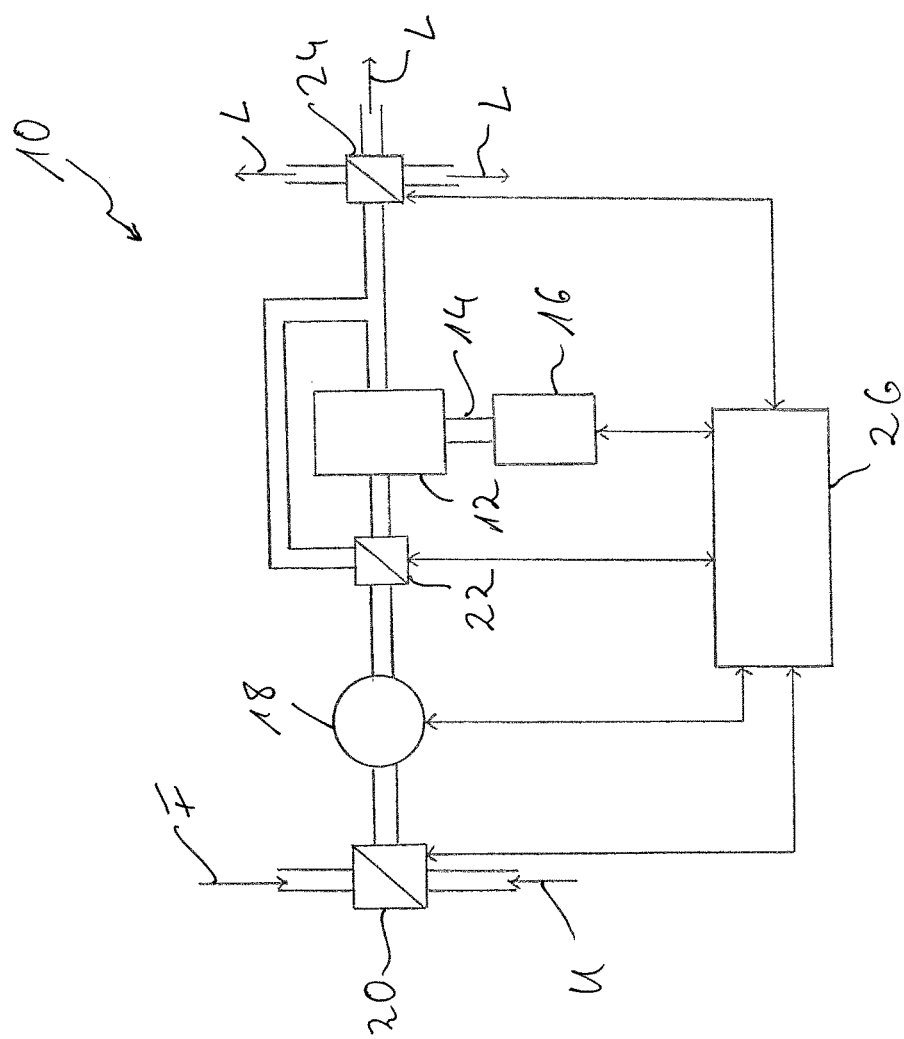
FIG. 1 is a view showing a vehicle temperature control system in a simplified, schematic manner.

A vehicle temperature control system is generally designated by 10 in FIG. 1. As a central component, the vehicle temperature control system 10 comprises a heat exchanger 12, in which the air to be introduced into the vehicle interior can absorb heat. This heat is transported in a heat transfer medium circulating in a vehicle coolant system 14, i.e., for example, the vehicle coolant. In order to be able to provide heat especially for a parking heating operation, the vehicle temperature control system 10 comprises, further, a preferably fuel-operated vehicle heater 16, which may be integrated, for example, as original equipment into a vehicle and thus into the vehicle temperature control system 10, but may also represent a system area to be retrofitted using the principles of the present invention.

A vehicle blower, which is generally designated by 18, is provided with a vehicle blower motor to deliver the air L to be introduced into the vehicle interior. A fresh air/circulating air flap unit 20, which can mix fresh air F fed from the outside and circulating air U drawn from the vehicle interior in a predeterminable ratio, may be provided, for example, in the direction of flow upstream of the vehicle blower 18. Before flowing through the heat exchanger 12 in a hot air flap unit 22, the air delivered by the vehicle blower 18 can be divided into two air streams, one of which flows through the heat exchanger 12, and the other evades the heat exchanger 12. The portion of the air to be introduced into the vehicle interior, which shall actually be heated in the heat exchanger 12, can thus be specified. An air flap unit 24, symbolically representing a plurality of air flap units, through which the outflow direction or the outflow site of the air L to be introduced into the vehicle interior can be set, is shown positioned downstream of the heat exchanger 12 and, for example, close to the vehicle interior. For example, the air L to be introduced into the vehicle interior can be conducted through the air flap unit(s) 24 in the direction of the window pane or window panes of a vehicle, in the direction of a front interior area or a rear interior area or/and in the direction of the leg room. The vehicle temperature control system 10 can, further, comprise an air-conditioning system, by means of which the air L to be introduced into the vehicle interior can also be cooled, if necessary.

An actuating system area, generally designated by 26 and described in detail below with reference to FIG. 2, which can suitably operate the vehicle temperature control system 10 during a normal operation of the vehicle to be able to provide desired climatic conditions in the vehicle interior, is provided to be able to control or regulate the operation of the various system areas of the vehicle temperature control system 10 to be actuated in a suitable manner. The actuating system area 26 is further configured, for example, to thermally condition the vehicle in a parking heating operation before the start-up of the vehicle.

Before especially the configuration of the actuating system area 26 or the interaction of the various components of same is also explained in detail below with reference to FIG. 2, it should be pointed out that the configuration of a vehicle temperature control system shown in FIG. 1, especially the various components provided for conducting the flow or even for generating the air flow, can be varied in many different ways without deviating from the principles of the present invention.

As a central component, the actuating system area 26 comprises a vehicle data bus 28, for example, a CAN data bus. This vehicle data bus 28 is used in the vehicle to supply various system areas of the vehicle, especially actuating units, with the information needed for the operation thereof or to place such system areas in data exchange connection.

Figure 2:
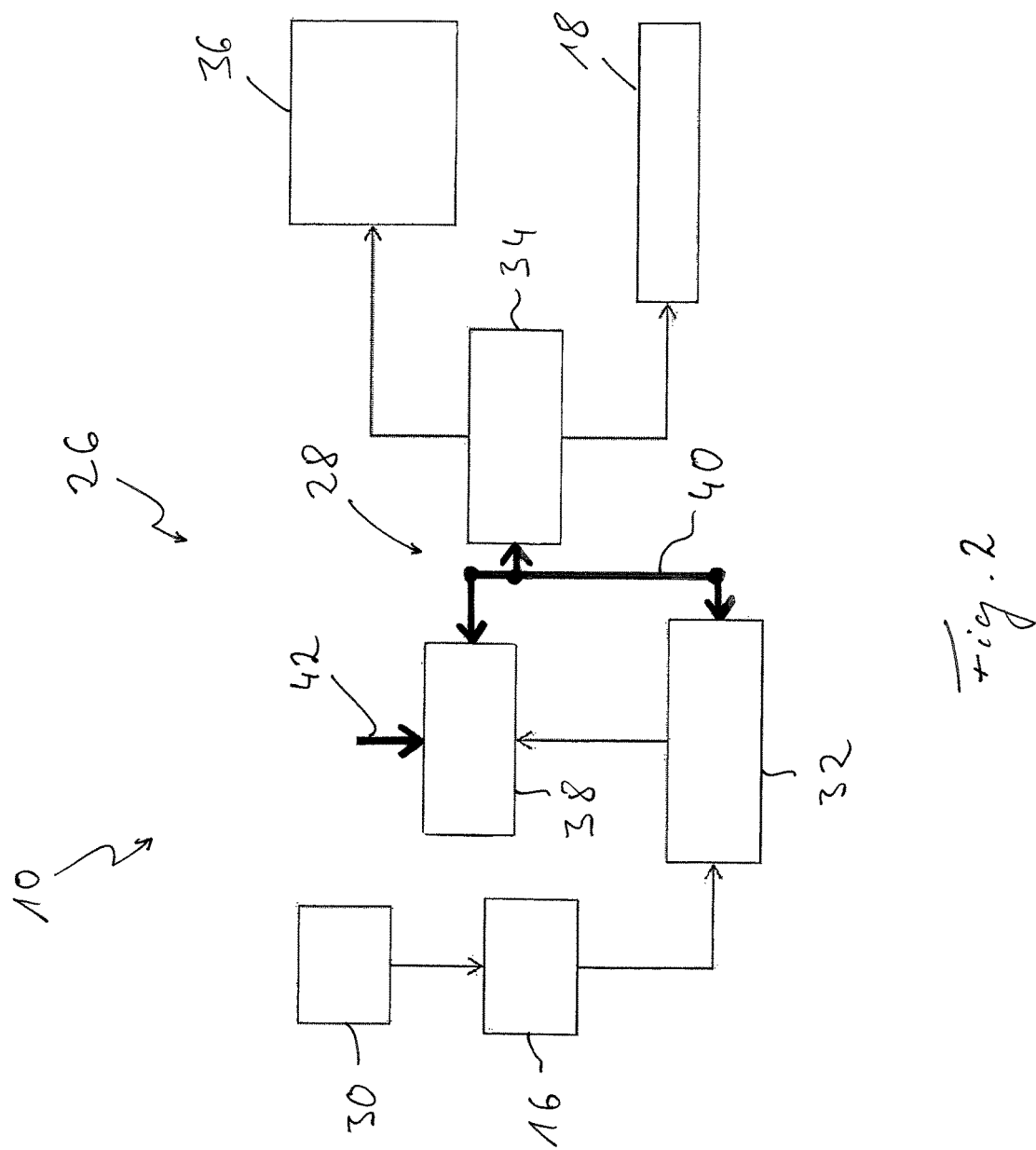
FIG. 2 is a block diagram of an actuating system area of the vehicle temperature control system shown in FIG. 1.

An operating device 30, for example, an operating element mounted in the vehicle and suitable for inputting operation-relevant data or even a remote-control operating element, is associated with the vehicle heater 16 also shown in FIG. 2. Via this operating device 30, a driver can provide or store the information desired for the operation of the vehicle heater 16, which information may contain, for example, the intended time of starting to use a vehicle, the desired duration of heating or even the desired temperature of the vehicle interior. On the basis of such information, the operating device 30 can put the vehicle heater 16 into operation for the suitable time and in the suitable operating mode. In particular, the operating device 30 may also comprise an ON switch, the actuation of which can trigger the direct starting of operation of the vehicle heater 16.

The actuating system area 26 comprises, further, a blower control unit 32 in data exchange connection with the vehicle data bus 28. Furthermore, an air-conditioning control unit 34 is in data exchange connection with the vehicle data bus 28. The air-conditioning control unit 34 is, in turn, in actuating connection with the vehicle blower 18 or with a blower motor of same and with one or a plurality of air flow influencing units 36, which can be provided, for example, by the fresh air/circulating air flap unit 20, the hot air flap unit 22 or the air flap unit(s) 24 shown in FIG. 1.

The actuating system area 26 comprises, further, in association with the vehicle data bus 28, a vehicle data bus disconnect unit 38 configured, e.g., as a relay or switch arrangement. This disconnect unit is in actuating connection with the blower control unit 32. As explained below, upon corresponding actuation, the vehicle data bus disconnect unit 38 can uncouple or disconnect a partial vehicle data bus 40 from the rest of the vehicle data bus 42 such that, in principle, the vehicle data bus 28 can be divided into the partial vehicle data bus 40 and the rest of the vehicle data bus 42 by means of the vehicle data bus disconnect unit 38. Essentially only a data exchange connection between the blower control unit 32 and the air-conditioning control unit 34 is made possible in the partial vehicle data bus 40. The system areas disconnected from the partial vehicle data bus 40 by the vehicle data bus disconnect unit 38, which system areas are in data exchange connection with the rest of the vehicle data bus 42, are disconnected from this data exchange connection between the blower control unit 32 and the air-conditioning control unit 34.

The operation of the vehicle temperature control system 10 described above with reference to FIGS. 1 and 2, especially of the actuating system area 26 in case of carrying out a heating operation of the vehicle heater 16, especially of a parking heating operation, will be explained below.

It should first be assumed that the operating device 30 puts the vehicle heater 16 into operation at a specified point in time or sends information to the vehicle heater 16, which information causes this vehicle heater to start the heating operation. This preferably fuel-operated vehicle heater 16 generates heat and can transfer this heat to a heat transfer medium, i.e., for example, the coolant circulating in the coolant system 14. For example, with the starting of the heating operation of the heater 16 or if the heat transfer medium circulating in the coolant system 14 has reached a sufficient temperature, the vehicle heater 16 generates an activation actuating command for the blower control unit 32 such that it is detected in the blower control unit 32 that the heater 16 is operating or thermal conditions have been achieved which permit the heating of the vehicle interior. This activation actuating command can, for example, be represented by applying a voltage signal to a corresponding actuating input of the blower control unit 32.

In response to the receipt of this activation actuating command from the vehicle heater 16, the blower control unit 32 sends a vehicle data bus disconnect command to the vehicle data bus disconnect unit 38. In response to this vehicle data bus disconnect command, the vehicle data bus disconnect unit 38 disconnects the partial vehicle data bus 40 from the rest of the vehicle data bus 42 such that, as was explained above, a data communication not detected in the rest of the vehicle data bus 42 can occur in the partial vehicle data bus 40.

After the disconnection of the vehicle data bus 28, the blower control unit 32 generates an activation actuating command for the air-conditioning control unit 34, which receives this actuating command via the partial vehicle data bus 40. Since the air-conditioning control unit 34, just as essentially all remaining system areas, which are in data exchange connection with the vehicle data bus 28, was in an inoperative state before, the receipt of the activation actuating command first triggers an activation of the air-conditioning control unit, i.e., the changing over to an operating state. In this operating state, the air-conditioning control unit waits for the receipt of commands specifying its next operation via the partial vehicle data bus 40. That portion of the activation actuating command for the air-conditioning control unit 34, which activates this unit or puts it in an operating state, may correspond, for example, to an "ignition-ON command," as it is sent via the vehicle data bus 28 during the normal start-up of a vehicle.

The activation actuating command for the air-conditioning control unit 34 generated by the blower control unit 32 contains not only a command component, which activates the air-conditioning control unit 34, but also contains information about how the air-conditioning control unit 34 shall actuate the system areas to be actuated by this unit. For example, for the actuation of the vehicle blower 18 or of the blower motor of same, provisions may be made for this vehicle blower to be put into operation at a predetermined speed, for example, a speed lying within an average speed range. It should be pointed out that an average speed range may be a speed range, which may lie essentially in the middle of a speed spectrum between a speed of zero and a maximum speed.

The activation actuating command for the air-conditioning control unit 34 generated by the blower control unit 32 may further specify that, for example, the fresh air/circulating air flap unit 20 to be interpreted as an air flow influencing unit 36 is to be set such that this unit provides a predetermined ratio of fresh air F to circulating air U. Furthermore, the activation actuating command for the air-conditioning control unit 34 may specify, in what condition the hot air flap unit 22 as an air flow influencing unit 36 conducts the air to be introduced into the vehicle interior through the heat exchanger 12 or feeds it around this heat exchanger. Finally, the activation actuating command for the air-conditioning control unit 34 may also specify how the air flap units 24 conducting the air L into the vehicle interior are to be adjusted to reach an optimal conditioning of the vehicle interior. For example, these air flap units can be put into a defrost position, which ensures that the entire amount of air or at least a large part of the air L to be introduced into the vehicle interior is conducted in the direction of the window panes of the vehicle, especially in the direction of a windshield.

In the above-described manner, it is ensured by the various activation actuating commands and the communication occurring between the blower control unit 32 and the air-conditioning control unit 34 that the heat provided in the vehicle heater is optimally transferred to the air to be introduced into the vehicle interior and thus can be used for the conditioning of the vehicle interior. Since no information, which is in connection with the communication occurring in the partial vehicle data bus 40, is present in the rest of the vehicle data bus 42 in this state because of the disconnection of the vehicle data bus 28, there is no risk that the system areas connected to the rest of the vehicle data bus 42 are put into operation in an unsuitable manner or at the incorrect time or that error signals are generated or stored.

If the parking heating operation shall be ended, for example, after the sufficient heating of the vehicle interior, the vehicle heater 16 is deactivated such that generation of the activation actuating command sent to the blower control unit 32 is also ended or a deactivation actuating command is sent. In response thereto, the blower control unit 32 ends the sending of the activation actuating command for the air-conditioning control unit 34 such that this air-conditioning control unit also sets the actuation of the vehicle blower 18 or of the air flow influencing units 36. As a result, the motor of the vehicle blower 18 is switched off and, for example, the air flow influencing units 36 are put into a state that they had assumed before starting the parking heating operation. The air-conditioning control unit 34 is put into an inoperative state again as well because of the ending of the sending of the activation actuating command by the blower control unit 32 or due to the sending of the deactivation actuating command. The blower control unit 32 then ends the sending of the vehicle data bus disconnect command or sends a command to the vehicle data bus disconnect unit 38, which causes this vehicle data bus disconnect unit to re-establish the connection between the rest of the vehicle data bus 42 and the partial vehicle data bus 40. All these transitions into an inactive state may ultimately be triggered by the activation actuating command sent from the vehicle heater 16 no longer being sent and also no more activation actuating commands or no vehicle data bus disconnect command being sent from the blower control unit 32 as a result of this, whereupon all system areas previously impacted by corresponding commands reach an inactive state or return to a state assumed before carrying out the vehicle heating operation and are thus in a state suitable for starting to use a vehicle.

In principle, it cannot be ruled out that the use of a vehicle shall be started during the operation of the vehicle heater 16. This can be detected, for example, by a vehicle being opened, a vehicle remote-control operation being actuated, a drive unit being started or the like. Such activities indicating the start to use can be detected by the transmission of corresponding commands in the rest of the vehicle data bus 42. Since the vehicle data bus disconnect unit 38 is also in connection with the rest of the vehicle data bus 42 and provided it detects the transmission of commands indicating a possible start to use of the vehicle in the rest vehicle data bus 42, the vehicle data bus disconnect unit 38 ends the disconnection of the vehicle data bus 28 in the partial vehicle data bus 40 and the rest of the vehicle data bus 42 in response to such activities. As a result, the air-conditioning control unit 34 and the blower control unit 32 are also again connected to the complete vehicle data bus 28 and in particular, the blower control unit 32 also receives data, which indicate the activities possibly indicating the start to use. As soon as the blower control unit 32 receives especially such data via the vehicle data bus 28, the generation of the vehicle data bus disconnect command, which was commanded per se by the activation actuating command from the vehicle heater 16, is overridden and this disconnect command is not further generated. Likewise, the blower control unit 32 will stop the generation of the activation actuating command for the air-conditioning control unit 34 such that, similar to a normal switching-off process, this blower control unit stops the previously specified actuation of the vehicle blower 18 or of the air flow influencing units 36 and either goes into its inoperative state or goes into an operating state specified by commands now transmitted in the vehicle data bus 28 and accordingly actuates the motor of the vehicle blower 18 or a variety of the air flow influencing units 36. If the vehicle coolant circulating in the coolant system is still not sufficiently temperature controlled in this state or, e.g., a desired temperature of the vehicle interior is not yet reached, the operation of the vehicle heater 16 is continued, which results in this heater continuing to send the activation actuating command to the blower control unit 32 without further response from the blower control unit 32.

As soon as the activities that have indicated the start-up of the vehicle are ended and corresponding data or commands are no longer transported via the vehicle data bus 28, the blower control unit 32 detects this, so that the override triggered by the vehicle data bus 28 is cancelled and, for example, after a specified resting time of a few seconds, the blower control unit 32 again begins to send the vehicle data bus disconnect command to the vehicle data bus disconnect unit 38. This vehicle data bus disconnect unit then separates the vehicle data bus 28 again in the manner described above into the partial data bus 40 and the rest of the data bus 42, so that after restarting the generation or sending the activation actuating command from the blower control unit 32 to the air-conditioning unit 34, this unit is also activated again correspondingly or is put into operation for actuation of the vehicle blower 18 or of the air flow influencing units 36 corresponding to the activation actuating command from the blower control unit 32. The previously interrupted parking heating operation can then be continued with restarted feeding of air heated in the heat exchanger 12 into the vehicle interior.

With the above-described course of action or even the above-described configuration of a vehicle temperature control system, it is possible to integrate a vehicle heater, which is also provided, for example, as a retrofit system, into a vehicle or a vehicle temperature control system in a simple manner such that, even though there is no direct data exchange connection of the vehicle heater with the vehicle data bus, system areas of the vehicle temperature control system connected to the vehicle data bus, especially the partial vehicle data bus, can nevertheless be used in order to be able to access different system areas that are relevant, for example, in carrying out a parking heating operation for the introduction of thermally conditioned air into the vehicle interior.

The present invention consequently pertains to a method for operating a vehicle temperature control system, in which after activating a vehicle heater 16:

a) the vehicle heater 16 sends an activation actuating command to a blower control unit 32, b) the blower control unit 32 sends a vehicle data bus disconnect command to a vehicle data bus disconnect unit 38 in response to the receipt of the activation actuating command from the vehicle heater 16, c) the vehicle data bus disconnect unit 38 disconnects a vehicle data bus 28 for providing a partial vehicle data bus 40 in response to the receipt of the vehicle data bus disconnect command from the blower control unit 32, d) the blower control unit 32 sends an activation actuating command to an air-conditioning control unit 34 after providing the partial vehicle data bus 40, and e) the air-conditioning control unit 34 puts at least one vehicle blower 18 or/and at least one air flow influencing unit 36 into a specified operating state in response to the receipt of the activation actuating command from the blower control unit 32.

While specific embodiments of the invention have been shown and described in detail to illustrate the application of the principles of the invention, it will be understood that the invention may be embodied otherwise without departing from such principles.

The invention claimed is:

1. A method for operating a vehicle temperature control system, wherein the vehicle temperature control system comprises:

a vehicle data bus;

a blower control unit in data exchange connection with the vehicle data bus for generating actuating commands at least for at least one vehicle blower;

an air-conditioning control unit in data exchange connection with the vehicle data bus for generating actuating commands at least for at least one air flow influencing unit, wherein the air-conditioning control unit is configured to receive actuating commands generated by the blower control unit at least for the at least one vehicle blower via the vehicle data bus and to actuate the at least one vehicle blower corresponding to the actuating commands received;

a vehicle heater providing heat to be transferred to the air to be introduced into a vehicle interior, wherein an operating device for inputting or generating or both inputting and generating information defining a heating operation to be carried out is associated with the vehicle heater, wherein the vehicle heater is in actuating connection with the blower control unit; and a vehicle data bus disconnect unit for disconnecting the vehicle data bus such that a partial vehicle data bus permitting the data exchange connection between the blower control unit and the air-conditioning control unit is provided, wherein the vehicle data bus disconnect unit is in actuating connection with the blower control unit, in which method after activating the vehicle heater comprises the steps of:

with the vehicle heater sending an activation actuating command to the blower control unit;

with the blower control unit sending a vehicle data bus disconnect command to the vehicle data bus disconnect unit in response to the receipt of the activation actuating command from the vehicle heater;

with the vehicle data bus disconnect unit disconnecting the vehicle data bus for providing the partial vehicle data bus in response to the receipt of the vehicle data bus disconnect command from the blower control unit;

with the blower control unit sending an activation actuating command to the air-conditioning control unit after providing the partial vehicle data bus; and with the air-conditioning control unit putting the at least one vehicle blower or the at least one air flow influencing unit or both the at least one vehicle blower and the at least one air flow influencing unit into a specified operating state in response to the receipt of the activation actuating command from the blower control unit;

wherein the air-conditioning control unit is put into an operating state by the sending of the activation actuating command sent by the blower control unit, wherein in the operating state, the air-conditioning control unit puts the at least one vehicle blower or the at least one air flow influencing unit or both the at least one vehicle blower and the at least one air flow influencing unit into an operating state specified by the activation actuating command from the blower control unit.

2. A method in accordance with claim 1, wherein in the specified operating state:
at least one vehicle blower is activated for operation at a predetermined speed or within an average speed range; or
a hot air flap unit, as the at least one air flow influencing unit is in an actuating state providing a maximum temperature; or
at least one air flap unit, as the at least one air flow influencing unit, is in a defrost position; or
a fresh air/circulating air flap unit, as the at least one air flow influencing unit is in a position providing a predetermined fresh air/circulating air ratio; or
any combination of at least one vehicle blower is activated for operation at a predetermined speed or within an average speed range and a hot air flap unit, as the at least one air flow influencing unit is in an actuating state providing a maximum temperature and at least one air flap unit, as the at least one air flow influencing unit, is in a defrost position and a fresh air/circulating air flap unit, as the at least one air flow influencing unit is in a position providing a predetermined fresh air/circulating air ratio.

3. A method in accordance with claim 1, wherein after ending the operation of the vehicle heater the method further comprises the steps of:
with the blower control unit ending the sending of the activation actuating command to the air-conditioning control unit or sending a deactivation actuating command to the air-conditioning control unit or both ending the sending of the activation actuating command to the air-conditioning control unit and sending a deactivation actuating command to the air-conditioning control unit, wherein thereafter the air-conditioning control unit deactivates the at least one vehicle blower or puts the at least one air flow influencing unit back into an initial state or both deactivates the at least one vehicle blower and puts the at least one air flow influencing unit back into an initial state and the air-conditioning control unit assumes an inoperative state; and with the blower control unit ending the sending of the vehicle data bus disconnect command or sending a vehicle data bus connect command to the vehicle data bus disconnect unit or both ending the sending of the vehicle data bus disconnect command and sending a vehicle data bus connect command to the vehicle data bus disconnect unit, wherein thereafter the vehicle data bus disconnect unit ends the disconnection of the vehicle data bus for providing the partial vehicle data bus.

4. A method in accordance with claim 1, wherein if activities indicating a start-up of a vehicle are detected during the operation of the vehicle heater, the method further comprises the steps of:
with the vehicle data bus disconnect unit ending the disconnection of the vehicle data bus; and,
after the ending of the disconnection of the vehicle data bus, with the blower control unit ending the sending of the activation actuating command to the data bus disconnect unit and the sending of the activation actuating command to the air-conditioning control unit.

5. A method in accordance with claim 4, wherein the vehicle heater resumes the heating operation as a function of a temperature of a heat transfer medium to be heated by the vehicle heater and, furthermore, sends the activation actuating command to the blower control unit.

6. A method in accordance with claim 5, wherein if the activities indicating a start-up of a vehicle are ended before an intended end of operation of the vehicle heater again carrying out the steps comprising:
sending a vehicle data bus disconnect command to the vehicle data bus disconnect unit;
disconnecting the vehicle data bus for providing the partial vehicle data bus;
sending an activation actuating command to the air-conditioning control unit after providing the partial vehicle data bus; and
putting the at least one vehicle blower or the at least one air flow influencing unit or both the at least one vehicle blower and the at least one air flow influencing unit into a specified operating state in response to the receipt of the activation actuating command from the blower control unit.

* * * * *